(12) United States Patent
Hashida

(10) Patent No.: US 12,261,864 B2
(45) Date of Patent: Mar. 25, 2025

(54) INFORMATION ANALYZING APPARATUS, INFORMATION ANALYZING METHOD, AND COMPUTER-READABLE RECORDING MEDIUM

(71) Applicant: NEC Corporation, Tokyo (JP)

(72) Inventor: Keisuke Hashida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 273 days.

(21) Appl. No.: 17/791,387

(22) PCT Filed: Jan. 15, 2020

(86) PCT No.: PCT/JP2020/001126
§ 371 (c)(1),
(2) Date: Jul. 7, 2022

(87) PCT Pub. No.: WO2021/144895
PCT Pub. Date: Jul. 22, 2021

(65) Prior Publication Data
US 2023/0066454 A1 Mar. 2, 2023

(51) Int. Cl.
*H04L 9/40* (2022.01)
*G06F 40/157* (2020.01)
*G06F 40/279* (2020.01)

(52) U.S. Cl.
CPC ........ *H04L 63/1425* (2013.01); *G06F 40/157* (2020.01); *G06F 40/279* (2020.01)

(58) Field of Classification Search
CPC . H04L 63/1425; G06F 40/157; G06F 40/279; G06F 21/00; G06F 40/237
See application file for complete search history.

(56) References Cited

U.S. PATENT DOCUMENTS

| | | | |
|---|---|---|---|
| 9,716,721 B2* | 7/2017 | Hovor | H04L 63/1416 |
| 10,033,747 B1* | 7/2018 | Paithane | G06F 21/566 |
| 10,951,645 B2* | 3/2021 | Mathew | H04L 41/142 |
| 11,403,349 B2* | 8/2022 | Mannar | G06V 10/454 |

(Continued)

FOREIGN PATENT DOCUMENTS

| | | |
|---|---|---|
| JP | 2008-197877 A | 8/2008 |
| JP | 2009-075582 A | 4/2009 |

(Continued)

OTHER PUBLICATIONS

Benjamin et al.; "Developing Understanding of Hacker Language through the ◆ ◆ se of Lexical Semantics", 2015, IEEE, pp. 79-84. (Year: 2015).*

(Continued)

*Primary Examiner* — Matthew Smithers

(57) ABSTRACT

An information analyzing apparatus 10 includes: a detection unit 11 configured to detect unknown word information expressing an unknown word contained in document information collected from web content; and a conversion unit 12 configured to, using forum expression information contained in the unknown word information detected, converting the forum expression information into formal expression information by referring to expression conversion information for converting a forum expression into a formal expression set in advance.

15 Claims, 6 Drawing Sheets

(56) References Cited

U.S. PATENT DOCUMENTS

| | | | | |
|---|---|---|---|---|
| 2010/0030723 | A1* | 2/2010 | Au | G06F 16/3344 |
| | | | | 707/E17.014 |
| 2012/0136884 | A1* | 5/2012 | Kanawa | G06F 16/8358 |
| | | | | 707/E17.07 |
| 2014/0337974 | A1* | 11/2014 | Joshi | H04L 63/1425 |
| | | | | 726/23 |
| 2017/0323016 | A1 | 11/2017 | Feng et al. | |
| 2019/0007440 | A1* | 1/2019 | Lavi | G06Q 50/26 |
| 2019/0098039 | A1* | 3/2019 | Gates | G16H 20/70 |
| 2019/0156042 | A1* | 5/2019 | Kim | G06F 16/258 |
| 2019/0347327 | A1* | 11/2019 | Patil | G06F 16/951 |
| 2020/0036743 | A1* | 1/2020 | Almukaynizi | G06N 5/048 |
| 2021/0110113 | A1* | 4/2021 | Brousseau | G06F 40/55 |
| 2021/0209307 | A1* | 7/2021 | Serna | G06F 40/30 |
| 2022/0070196 | A1* | 3/2022 | Sarkar | G06N 5/02 |
| 2022/0229912 | A1* | 7/2022 | Tavabi | H04L 63/1433 |

FOREIGN PATENT DOCUMENTS

| | | |
|---|---|---|
| JP | 2009-140049 A | 6/2009 |
| JP | 2010-257021 A | 11/2010 |
| JP | 2019-185400 A | 10/2019 |
| WO | 2017/104655 A1 | 6/2017 |

OTHER PUBLICATIONS

Benjamin et al.; "Exploring Threats and Vulnerabilities in Hacker Web: Forums, IRC and Carding Shops", 2015, IEEE, pp. 85-90. (Year: 2015).*

Jaeger et al.; "Multi-Step Attack Pattern Detection on Normalized Event Logs", 2015, IEEE 2nd International Conference on Cyber Security and Cloud Computing, pp. 390-398. (Year: 2015).*

Nunes et al.; "Darknet and Deepnet Mining for Proactive Cybersecurity Threat Intelligence", 2016, IEEE, pp. 7-12 (Year: 2016).*

Deliu et al.; "Extracting Cyber Threat Intelligence From Hacker Forums: Support Vector Machines versus Convolutional Neural Networks", 2017, IEEE International Conference on Big Data (BIGDATA), pp. 3648-3656. (Year: 2017).*

Cherqi et al.; "Analysis of Hacking Related Trade in the Darkweb", 2018, IEEE, pp. 79-84. (Year: 2018).*

Sadique et al.; "Automated Structured Threat Information Expression (STIX) Document Generation with Privacy Preservation", IEEE, pp. 847-853. (Year: 2018).*

Deliu et al.; "Collecting Cyber Threat Intelligence from Hacker Forums via a Two-Stage, Hybrid Process using Support Vector Machines and Latent Dirichlet Allocation", 2018, IEEE International Conference on Big Data (Big Data), pp. 5008-5013. (Year: 2018 ).*

Williams et al.; "Incremental Hacker Forum Exploit Collection and Classification for Proactive Cyber Threat Intelligence: An Exploratory Study", 2018, IEEE, pp. 94-99. (Year: 2018).*

Ebrahimi et al.; "Detecting Cyber Threats in Non-English Hacker Forums: An Adversarial Cross-Lingual Knowledge Transfer Approach", 2020, IEEE, pp. 20-26. (Year: 2020).*

Yang et al.; "Dark web forum correlation analysis research", 2019, IEEE 8th Joint International Information Technology and Artificial Intelligence Conference, pp. 1216-1220. (Year: 2019).*

Yang et al.; "Hadoop-based Dark Web Threat Intelligence Analysis Framework", 2019, IEEE 3rd Advanced Information Management, Communicates, Electronic and Automation Control Conference, pp. 1088-1091. (Year: 2019).*

Nunes et al.; "Darknet and Deepnet Mining for Proactive Cybersecurity Threat Intelligence", 2016, arXiv:1607.08583V1, pp. 1-6. (Year: 2016).*

Modi et al.; "Towards Automated Threat Intelligence Fusion", 2016, IEEE 2nd International Conference on Collaboration and Internet Computing, pp. 408-416. (Year: 2016).*

Macdonald et al.; "Identifying Digital Threats in a Hacker Web Forum", 2015, IEEE/ACM International Conference on Advances in Social Networks Analysis and Mining, pp. 926-933. (Year: 2015).*

English translation of Written opinion for PCT Application No. PCT/JP2020/001126, mailed on Mar. 10, 2020.

JP Office Communication for JP Application No. 2021-570549, mailed on Jan. 23, 2024 with English Translation.

International Search Report for PCT Application No. PCT/JP2020/001126, mailed on Mar. 10, 2020.

Fujii et al., "Cybersecurity Intelligence Structuring Method with Named Entity Recognition in Consideration of Unknown Word", 2018 Proceedings of the Computer Security Symposium, vol. 2018, No. 2, pp. 85-92.

* cited by examiner

Fig. 3

| FEATURE INFORMATION (FORUM EXPRESSIONS) | OFFICIAL EXPRESSION INFORMATION |
|---|---|
| n00b | noob |
| h4x | hacks |
| t34m | team |
| 1337 | leet |
| ⋮ | ⋮ |

Fig. 4

| FEATURE INFORMATION (CHARACTER STRING) | OFFICIAL EXPRESSION INFORMATION (CHARACTER STRING) |
|---|---|
| 00 | oo |
| 34 | ea |
| 337 | eet |
| ⋮ | ⋮ |

INFORMATION ANALYZING APPARATUS, INFORMATION ANALYZING METHOD, AND COMPUTER-READABLE RECORDING MEDIUM

This application is a National Stage Entry of PCT/JP2020/001126 filed on Jan. 15, 2020, the contents of all of which are incorporated herein by reference, in their entirety.

TECHNICAL FIELD

The invention relates to an information analyzing apparatus and an information analyzing method for analyzing information, and furthermore relates to a computer-readable recording medium having recorded thereon a program for realizing the same.

BACKGROUND ART

Threat information used in cyber-attacks, such as vulnerability information, malware information, criminal threats, and the like, are known to be publicized on hacker forums and the like on the Web. In addition, hacker forums may publicize threat information that should be noted earlier than such information is publicized by official external organizations related to security. Therefore, collecting and analyzing threat information publicized on hacker forums is useful as a defense against cyber-attacks.

However, information publicized on hacker forums and the like is unstructured and a mix of good and bad information, and thus analysts are currently extracting the threat information that should be noted from a large amount of information.

As related techniques, Patent Document 1 and Non-Patent Document 1 disclose techniques for utilizing threat information in web content to defend against cyber-attacks. A data processing device disclosed in Patent Document 1 discloses a technique for collecting software vulnerability information from information publicized on the Web. Additionally, the technique disclosed in Non-Patent Document 1 discloses a technique that uses machine learning to analyze threat information published in security reports and the like created by official external organizations.

List of Related Art Documents

Patent Document

Patent Document 1: Japanese Patent Laid-Open Publication No. 2008-197877

Non Patent Document

Non-Patent Document 1: Shota Fujii, "Cybersecurity Intelligence Structuring Method with Named Entity Recognition in Consideration of Unknown Word," Proceedings of the Computer Security Symposium, 2018, pp. 85-92.

SUMMARY OF INVENTION

Technical Problems

However, the data processing device of Patent Document 1 collects software vulnerability information, but is not a device that collects threat information aside from vulnerability information. It is therefore difficult to collect a wide range of threat information, without omissions, with unknown words appearing on a daily basis.

In addition, because the technique of Non-Patent Document 1 is targeted at security reports issued by official external organizations, it is difficult to analyze threat information by applying the technique of Non-Patent Document 1 to documents (e.g., text and the like) collected from hacker forums. The reason for this is that the model for analyzing threat information is built using security reports and the like produced by official external organizations.

In other words, it is difficult to analyze threat information using the model described above because documents publicized on hacker forums frequently use expression notation such as contractions, collapsed word writing styles, and the like (called "forum expressions" hereinafter).

An example object of the invention is to provide an information analyzing apparatus, an information analyzing method, and an information analyzing method that can analyze threat information even in documents containing forum expressions.

Solution to the Problems

In order to achieve the example object described above, an information analyzing apparatus according to an example aspect of the invention includes:

a detection unit configured to detect unknown word information expressing an unknown word contained in document information collected from web content; and a conversion unit configured to, using forum expression information contained in the unknown word information detected, converting the forum expression information into formal expression information by referring to expression conversion information for converting a forum expression into a formal expression set in advance.

Also, in order to achieve the example object described above, an information analyzing according to an example aspect of the invention includes:

(a) a step of detecting unknown word information expressing an unknown word contained in document information collected from web content; and (b) a step of converting, using forum expression information contained in the unknown word information detected, the forum expression information into formal expression information by referring to expression conversion information for converting a forum expression into a formal expression set in advance.

Furthermore, in order to achieve the example object described above, a computer-readable recording medium according to an example aspect of the invention includes a program recorded on the computer-readable recording medium, the program including instructions that cause the computer to carry out:

(a) a step of detecting unknown word information expressing an unknown word contained in document information collected from web content; and (b) a step of converting, using forum expression information contained in the unknown word information detected, the forum expression information into formal expression information by referring to expression conversion information for converting a forum expression into a formal expression set in advance.

Advantageous Effects of the Invention

As described above, according to the invention, it is possible to analyze threat information even in documents containing forum expressions.

BRIEF DESCRIPTION OF THE DRAWINGS

FIG. 3 is a diagram illustrating an example of the data structure of the expression conversion information (the dictionary base).

FIG. 4 is a diagram illustrating an example of the data structure of the expression conversion information (a character string).

EXAMPLE EMBODIMENT

Figure 1:
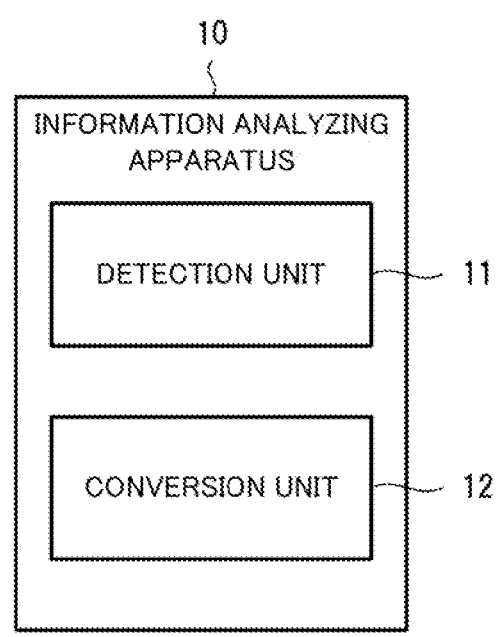
FIG. 1 is a diagram illustrating an example of the information analyzing apparatus.

First, information gathered from hacker forums and the like is a mix of good and bad information and is unstructured. Therefore, it is burdensome for an analyst to extract threat information that should be noted from the large amount of information collected. Therefore, automation using models is useful for reducing the burden on the analyst.

However, due to the unique writing culture, documents publicized in hacker forums use forum expressions such as contractions, rewriting to collapsed words, and rewriting letters. As a result, models generated using security reports and the like prepared by official external organizations cannot handle forum expressions, which reduces the accuracy of analyzing threat information. As a result, it is difficult to analyze threat information accurately. In the following, expressions that are not contractions, rewritten into collapsed words, or rewritten in text will be called "formal expressions". Formal expressions are used in security reports and the like prepared by official external organizations.

It is also conceivable to generate a dedicated model to analyze documents containing forum expressions, but even in this case, training data must be manually collected by the analyst, which places a heavy burden on the analyst.

Thus, through the process described above, the inventors discovered the problem of collecting documents containing forum expressions from hacker forums and the like and automatically analyzing threat information using the collected documents, and furthermore came to derive a means for solving that problem.

Specifically, the threat information to be extracted is identified, for example, from security terms having similar vocabulary. In particular, with respect to attack group names, malware names, and the like, different names are often used for the same attack group or malware, depending on the author of the security report or the author of the document publicized in the hacker forum. It is therefore useful to identify terms that refer to the same attack group or malware name.

Alternatively, in another example, the threat information to be extracted is extracted from security reports or public documents in hacker forums that are relevant to each other. By extracting relevant documents, it becomes possible to extract documents that describe specific attack groups or specific attack tools, and to understand trends thereof.

Alternatively, in yet another example, the threat information to be extracted is the extraction of new named entity recognitions in the security field. When a new attacker or malware emerges, a new attacker name or malware name is coined, and appears as a new term in security reports and the like. Therefore, when analyzing threat information, it is necessary to correctly identify such a new term as either the name of the attacker or the name of the malware.

The threat information which can be extracted may be configured such that various types of threat information are extracted depending on the application.

EXAMPLE EMBODIMENT

An example embodiment of the invention will be described hereinafter with reference to FIGS. 1 to 6.

Apparatus Configuration

First, an information analyzing apparatus 10 according to the example embodiment will be described with reference to FIG. 1. FIG. 1 is a diagram illustrating an example of the information analyzing apparatus.

The information analyzing apparatus 10 illustrated in FIG. 1 is an apparatus that can structure (analyze) threat information even in documents containing forum expressions. As illustrated in FIG. 1, the information analyzing apparatus 10 includes a detection unit 11 and a conversion unit 12.

Of these, the detection unit 11 detects unknown word information expressing unknown words contained in document information collected from web content. Using forum expression information contained in the detected unknown word information, the conversion unit 12 refers to expression conversion information set in advance for converting forum expressions into formal expressions, and converts the forum expression information into formal expression information.

In this manner, in the example embodiment, forum expressions in documents publicized on hacker forums are converted into formal expressions, and thus threat information can be structured (analyzed) even when using an analysis model generated through machine learning using security reports produced by official external organizations. Forum expressions can therefore also be handled, which makes it possible to improve the accuracy of analysis of threat information.

Additionally, forum expressions in documents publicized on hacker forums are converted into formal expressions, and there is thus no need to generate a dedicated model for analyzing documents containing forum expressions. Therefore, the model need not be generated, which eliminates the need for an analyst to manually collect an amount of threat information that is considered sufficient as training data.

System Configuration

Figure 2:
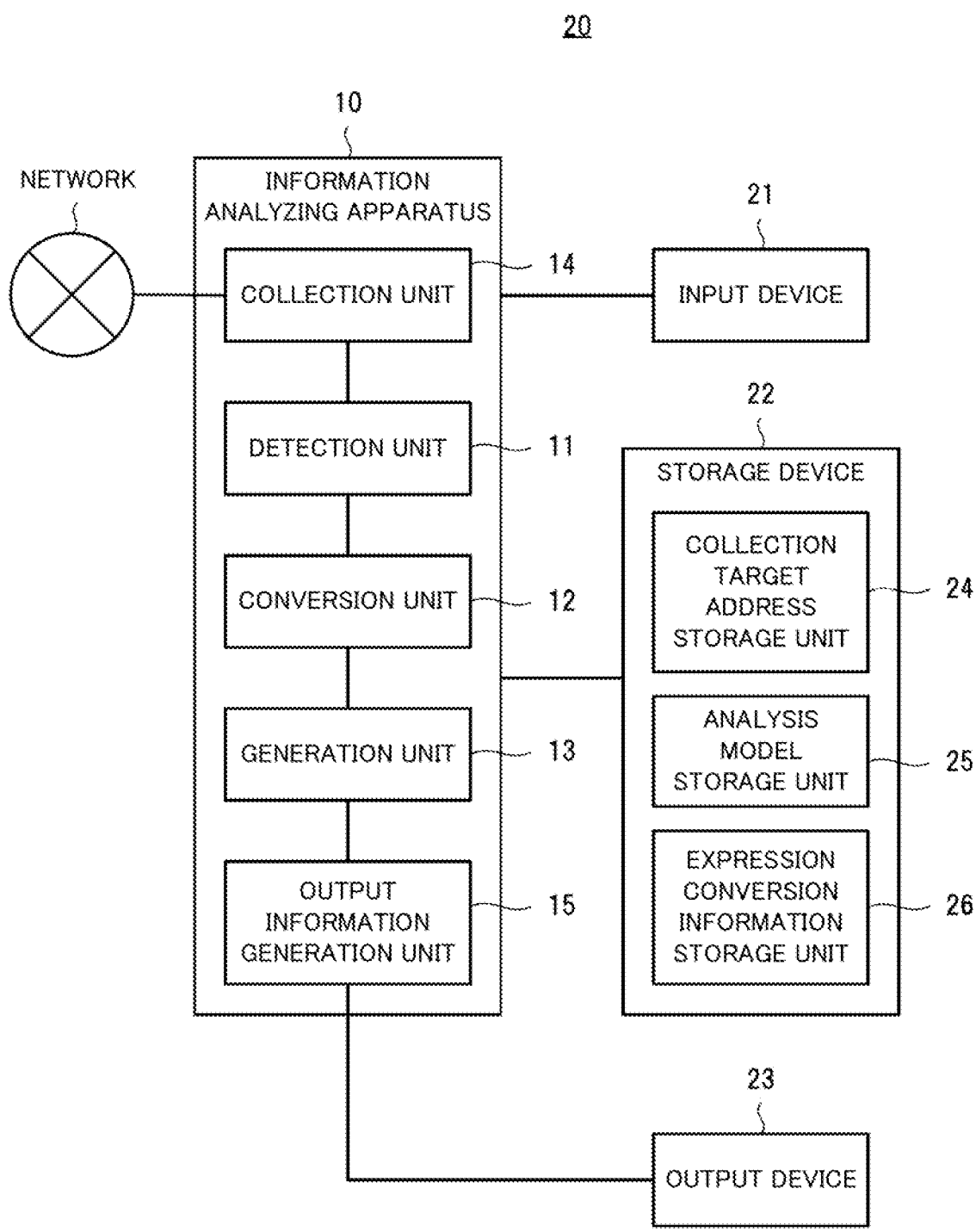
FIG. 2 is a diagram illustrating an example of a system including the information analyzing apparatus.

Next, the configuration of the information analyzing apparatus 10 according to the example embodiment will be described in further detail with reference to FIG. 2. FIG. 2 is a diagram illustrating an example of a system including the information analyzing apparatus.

As illustrated in FIG. 2, a system 20 in the example embodiment includes, in addition to the information analyzing apparatus 10, an input device 21, a storage device 22, and an output device 23. The storage device 22 includes a collection target address storage unit 24, an analysis model storage unit 25, and an expression conversion information storage unit 26. In addition to the detection unit 11, the conversion unit 12, and a generation unit 13, the information analyzing apparatus 10 in FIG. 2 includes a collection unit 14 and an output information generation unit 15.

The system will be described here.

The information analyzing apparatus 10 is, for example, an information processing device such as a server computer, a personal computer, or a mobile terminal equipped with a CPU (Central Processing Unit), an FPGA (Field-Programmable Gate Array), or both.

The input device 21 is a device used for storing, in the storage device 22, an address of web content on the Internet that expresses a location from which document information is to be collected. Specifically, a collection target address of document information, which is manually or automatically input using the input device 21, is stored in the collection target address storage unit 24 of the storage device 22. The collection target address is, for example, the address of a hacker forum that the collection unit 14 uses to collect document information. In the example in FIG. 2, the input device 21 stores information expressing the collection target address in the collection target address storage unit 24 of the storage device 22 via the information analyzing apparatus 10, but may instead be connected directly to the storage device 22.

The storage device 22 is a device that includes the collection target address storage unit 24, the analysis model storage unit 25, the expression conversion information storage unit 26, and the like. The storage device 22 is a storage device such as a server computer or a database, for example. The storage device 22 may be configured using a plurality of storage devices.

The collection target address storage unit 24 stores address information expressing an address from which a document is to be collected. The analysis model storage unit 25 records an analysis model to be used in the generation unit 13. The analysis model will be described in detail later. The expression conversion information storage unit 26 stores the expression conversion information, which is used in the conversion unit 12, and is used to detect a forum expression and convert the detected forum expression into an expression set in advance (second expression information).

The analysis model recorded in the analysis model storage unit 25 is generated in advance through machine learning using security reports and the like created by official external organizations. The information to be stored as the analysis model may be any information defined according to the threat information to be analyzed by the apparatus.

For example, when identifying security terms having similar vocabulary using this apparatus, each vocabulary used in a security report may be stored as a distributed representation using a method such as word2vec as the analysis model. Alternatively, if documents related to each other are extracted by the apparatus, each of security reports may be stored as a distributed representation using a method such as doc2vec as the analysis model. Alternatively, when new named entity recognitions in the security field are extracted by the apparatus, a trained model may be stored which has previously learned to which of the named entity recognitions in the security field, such as the attack group name, the malware name, or the like, each vocabulary used in the security report refers. At this time, any learning method may be used, such as support vector machines or deep learning, and the classifications of the named entity recognitions may be defined as desired.

A list of terms handled by the analysis model will be called "vocabulary" hereinafter. The vocabulary includes terms used in the security reports and the like described above, and formal expressions are used for these terms.

The output device 23 obtains output information, which has been converted into an output-ready format by the output information generation unit 15, and outputs a generated image, audio, and the like on the basis of the output information. The output device 23 is, for example, an image display device or the like that uses liquid crystals, organic EL (Electro Luminescence), or a CRT (Cathode Ray Tube). Furthermore, the image display device may include an audio output device such as a speaker or the like. The output device 23 may be a printing device such as a printer or the like.

The information analyzing apparatus will be described next.

The collection unit 14 collects document information from web content publicized on hacker forums and the like. Specifically, the collection unit 14 first reads the address information, expressing the collection target, recorded in the collection target address storage unit 24. The collection unit 14 then accesses the Internet using the address information read out and obtains document information from the web content indicated by the address information. The collection unit 14 then outputs the obtained document information to the detection unit 11.

In this case, the collection unit 14 may obtain document information using various processing methods known in the field of web scraping, such as processing for extracting the body part from the web content, processing for removing HTML (Hyper Text Markup Language) tags, and the like as necessary.

The detection unit 11 detects unknown word information expressing unknown words contained in the document information collected from the web content. Specifically, the detection unit 11 first obtains the document information from the collection unit 14. The detection unit 11 then uses the obtained document information to detect terms that are not included in the vocabulary of the analysis model as unknown words. Alternatively, the detection unit 11 may be configured to detect, as the unknown words, terms which are not in the vocabulary and which could not be recognized as named entity recognitions after applying named entity recognition to the obtained document information. Furthermore, the detection unit 11 may perform various types of processing performed in the field of natural language processing, such as morphological analysis and removal of stop words.

Note that the detected unknown word information includes not only terms outside the simple vocabulary, but also new terms that appeared after the creation of the analysis model that are important as threat information and terms rewritten from known terms that appeared through forum expressions.

The detection unit 11 then outputs the extracted forum expression information to the conversion unit 12.

The conversion unit 12 extracts the forum expression information representing forum expressions from the detected unknown word information, and converts the extracted forum expression information into formal expression information representing expressions used in security reports and the like. The formal expression information is information contained in the vocabulary of the analysis model.

Specifically, the conversion unit 12 first obtains the unknown word information from the detection unit 11. The conversion unit 12 then refers to feature information expressing features of the forum expression which the expression conversion information includes, and extracts the forum expression information from the detected unknown word information. The conversion unit 12 then converts the extracted forum expression information contained in the document information into formal expression information according to conversion rules for converting forum expressions into formal expressions, which the expression conversion information includes. The conversion unit 12 then outputs the document information converted into formal expressions to the generation unit 13.

The conversion unit 12 converts the forum expressions into formal expressions using, for example, the methods (1), (2), and (3) described below.

In method (1), a dictionary base in which forum expressions are associated with formal expressions is used as the expression conversion information. FIG. 3 is a diagram illustrating an example of the data structure of the expression conversion information (the dictionary base). FIG. 3 illustrates a dictionary base in which "feature information (forum expressions)" corresponding to feature information and "formal expression information" corresponding to formal expressions are associated with each other as the expression conversion information.

In method (1), the conversion unit 12 first refers to the "forum expression" expressing the feature information included in the expression conversion information illustrated in FIG. 3, and then extracts the forum expression information (feature information) from the unknown word information. For example, assume that "n00b" is extracted as feature information.

When feature information of "n00b" is extracted, the conversion unit 12 converts "n00" to the corresponding formal expression information "noob" using the expression conversion information illustrated in FIG. 3. In this manner, document information that does not have forum expressions is generated by performing expression conversion on the feature information contained in all of the detected unknown word information.

In method (2), a table in which some forum expressions are associated with some formal expressions is used as the expression conversion information. FIG. 4 is a diagram illustrating an example of the data structure of the expression conversion information (a character string). FIG. 4 illustrates a table in which "feature information (character string)" corresponding to feature information and "formal expression information (character string)" corresponding to formal expressions are associated with each other as the expression conversion information.

In method (2), the conversion unit 12 first refers to the feature information included in the expression conversion information illustrated in FIG. 4, and then extracts a character string contained in the forum expression information from the character strings contained in the unknown word information. For example, assume that "34" is extracted as feature information.

When feature information (a character string) of "34" is extracted, the conversion unit 12 converts "34" to the corresponding formal expression "ea" using the expression conversion information illustrated in FIG. 4. In this manner, document information that does not have forum expressions is generated by performing expression conversion on the feature information (character strings) contained in all of the detected unknown word information.

In method (3), the conversion unit 12 extracts feature information from unknown words, inputs the extracted feature information into a conversion model, and outputs formal expression information. A conversion model is, for example, a model which infers a formal expression corresponding to a forum expression, and which is generated through machine learning using forum expressions and corresponding official expressions as training data.

The conversion model may be built through machine learning such as a support vector machine, deep learning, or the like, for example. However, the machine learning is not limited to the specific methods described above. Note that the conversion model may be stored in the storage device 22 or within the information analyzing apparatus 10.

Note that in methods (1) and (2) above, tables of expression conversion information may be established for each hacker forum. At this time, the conversion unit 12 refers to the table of expression conversion information corresponding to the hacker forum in which the detected unknown word was used and converts the word to a formal expression. Furthermore, in method (3), a model for inferring the formal expression may be created for each hacker forum.

The generation unit 13 extracts threat information using the analysis model stored in the analysis model storage unit 25 and the converted document information, and furthermore structures the extracted threat information. The configuration may be such that various types of threat information are extracted as the threat information depending on the application.

For example, when identifying terms that indicate the same attack group name or malware name, the generation unit 13 applies word2vec using the converted document information and generates a distributed representation for each term in the document. Furthermore, the generation unit 13 determines that a term having a distributed representation that is close in distance to the distributed representation of a known attack group name or malware name given in advance is an alias for that known attack group or malware name. Here, the distance between the distributed representations of the two terms may be any distance, such as a Euclidean distance or a Cosine distance, and when the distance between the distributed representations of the two terms is less than a predetermined threshold, the distance between the distributed representations of the two terms is determined to be close.

Furthermore, to structure the threat information, the generation unit 13 uses STIX (Structured Threat Information eXpression) to express the same attack group name or malware name alias that has been identified. STIX is a standardized XML (eXtensible Markup Language) format for exchanging threat information. The generation unit 13 uses the "aliases" property of STIX or the like to describe the alias of the same attack group name or malware name that has been identified.

Alternatively, when extracting security reports or public documents in hacker forums that are related to each other, the generation unit 13 applies doc2vec to each instance of converted document information, and generates a distributed representation for each document. Furthermore, the generation unit 13 applies clustering, for example, to the generated distributed representations to generate clusters of similar distributed representations. The documents corresponding to each of the plurality of distributed representations in the same cluster generated here are extracted as the security reports or public documents in hacker forums that are related to each other. Here, any clustering algorithm may be used, such as the k-means method or the EM method.

Furthermore, to structure the threat information, the generation unit 13 gathers together information such as attack group names, malware names, and the like, which is included in security reports or public documents in hacker forums that are related to each other, and outputs the result as a series of threat information in STIX format.

Alternatively, when extracting new named entity recognitions in the security field, the generation unit 13 extracts information such as attack group names and malware names contained in each instance of converted document information using a trained model of the named entity recognitions contained in the analysis model. Furthermore, to structure the threat information, the generation unit 13 outputs the extracted attack group names and malware names in STIX format for each converted document, respectively.

The output information generation unit 15 converts the threat information structured information generated by the generation unit 13 into a format that can be output to the output device 23, and generates converted output information. The output information generation unit 15 then outputs the converted output information to the output device 23, and causes the output device 23 to output the structured threat information.

Apparatus Operations

Figure 5:
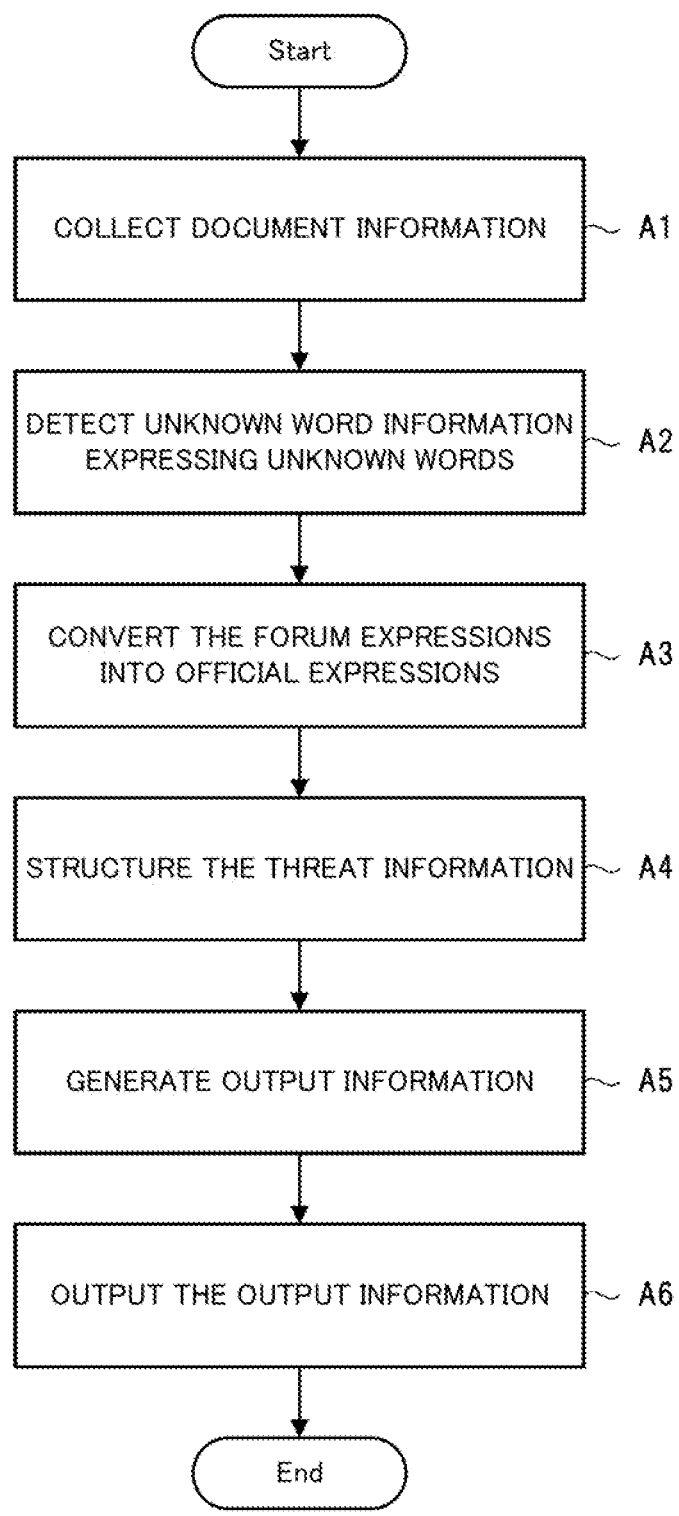
FIG. 5 is a diagram illustrating an example of the operations of the information analyzing apparatus.

Next, operations of the information analyzing apparatus according to an example embodiment of the invention will be described with reference to FIG. 5. FIG. 5 is a diagram illustrating an example of the operations of the information analyzing apparatus. The following descriptions will refer to FIGS. 1 to 4 as appropriate. In the example embodiment, an information analyzing method is realized by causing the information analyzing apparatus to operate. As such, the following descriptions of the operations of the information analyzing apparatus will be given in place of descriptions of the information analyzing method according to the example embodiment.

As illustrated in FIG. 3, first, the collection unit 14 collects document information from web content publicized on hacker forums and the like (step A1). Specifically, in step A1, the collection unit 14 first reads the address information, expressing the collection target, recorded in the collection target address storage unit 24. Then, in step A1, the collection unit 14 accesses the Internet using the address information read out and obtains document information from the web content indicated by the address information. Then, in step A1, the collection unit 14 outputs the obtained document information to the detection unit 11.

Next, the detection unit 11 detects unknown word information expressing unknown words contained in the document information collected from the web content (step A2). Specifically, in step A2, the detection unit 11 first obtains the document information from the collection unit 14. Then, in step A2, the detection unit 11 uses the obtained document information to detect unknown word information not included in the vocabulary of the analysis model. Then, in step A2, the detection unit 11 outputs the extracted forum expression information to the conversion unit 12.

Note that if no unknown word information is detected by the detection unit 11 in step A2, the detection unit 11 outputs the collected document information to the generation unit 13.

Next, the conversion unit 12 extracts the forum expression information representing forum expressions from the detected unknown word information, and converts the extracted forum expression information into formal expression information representing expressions used in security reports and the like (step A3). The formal expression information is information contained in the vocabulary of the analysis model.

Specifically, in step A3, the conversion unit 12 first obtains the unknown word information from the detection unit 11. The conversion unit 12 then refers to feature information expressing features of the forum expression which the expression conversion information includes, and extracts the forum expression information from the detected unknown word information. Then, in step A3, the conversion unit 12 converts the extracted forum expression information contained in the document information into formal expression information according to conversion rules for converting forum expressions into formal expressions, which the expression conversion information includes.

Then, in step A3, if the forum expressions contained in all of the detected unknown word information have been converted to formal expressions, document information without forum expressions is generated, and the conversion unit 12 outputs the document information converted to formal expressions to the generation unit 13.

Note that in step A3, the conversion unit 12 converts the forum expressions into formal expressions using, for example, the methods (1), (2), and (3) described above.

Next, using the analysis model stored in the analysis model storage unit 25, the generation unit 13 extracts threat information using the converted document information, and structures the threat information contained in the document information (step A4). Specifically, in step A4, the generation unit 13 obtains the converted document information from the conversion unit 12. Then, in step A4, the generation unit 13 extracts threat information using the analysis model and the obtained transformed document information, and furthermore structures the extracted threat information. Then, in step A4, the generation unit 13 outputs the structured threat information to the output information generation unit 15. Generating a threat information structured description format, for example, can be performed as the structuring of the threat information.

Next, the output information generation unit 15 converts the threat information structured information generated by the generation unit 13 into a format that can be output to the output device 23, and generates converted output information (step A5). The output information generation unit 15 then outputs the converted output information to the output device 23, and causes the output device 23 to output the structured threat information (step A6).

Effects of Embodiment

As described above, according to the example embodiment, forum expressions in documents publicized on hacker forums is converted into formal expressions, and thus threat information can be structured (analyzed) even when using an analysis model trained through machine learning using security reports produced by official external organizations. Forum expressions can therefore also be handled, which makes it possible to improve the accuracy of analysis of threat information.

Additionally, forum expressions in documents publicized on hacker forums are converted into formal expressions, and there is thus no need to generate a model for analyzing documents containing forum expressions. Therefore, the model need not be generated, which eliminates the need for an analyst to manually collect an amount of threat information that is considered sufficient as training data.

[Program]

The program according to an embodiment of the invention may be a program that causes a computer to execute steps A1 to A6 shown in FIG. 5. By installing this program in a computer and executing the program, the information analyzing apparatus and the information analyzing method according to the example embodiment can be realized. In this case, the processor of the computer performs processing to function as the collection unit 14, the detection unit 11, the conversion unit 12, the generation unit 13 and the output information generation unit 15.

Also, the program according to the example embodiment may be executed by a computer system constructed by a plurality of computers. In this case, for example, each computer may function as any of the collection unit 14, the detection unit 11, the conversion unit 12, the generation unit 13 and the output information generation unit 15.

[Physical Configuration]

Figure 6:
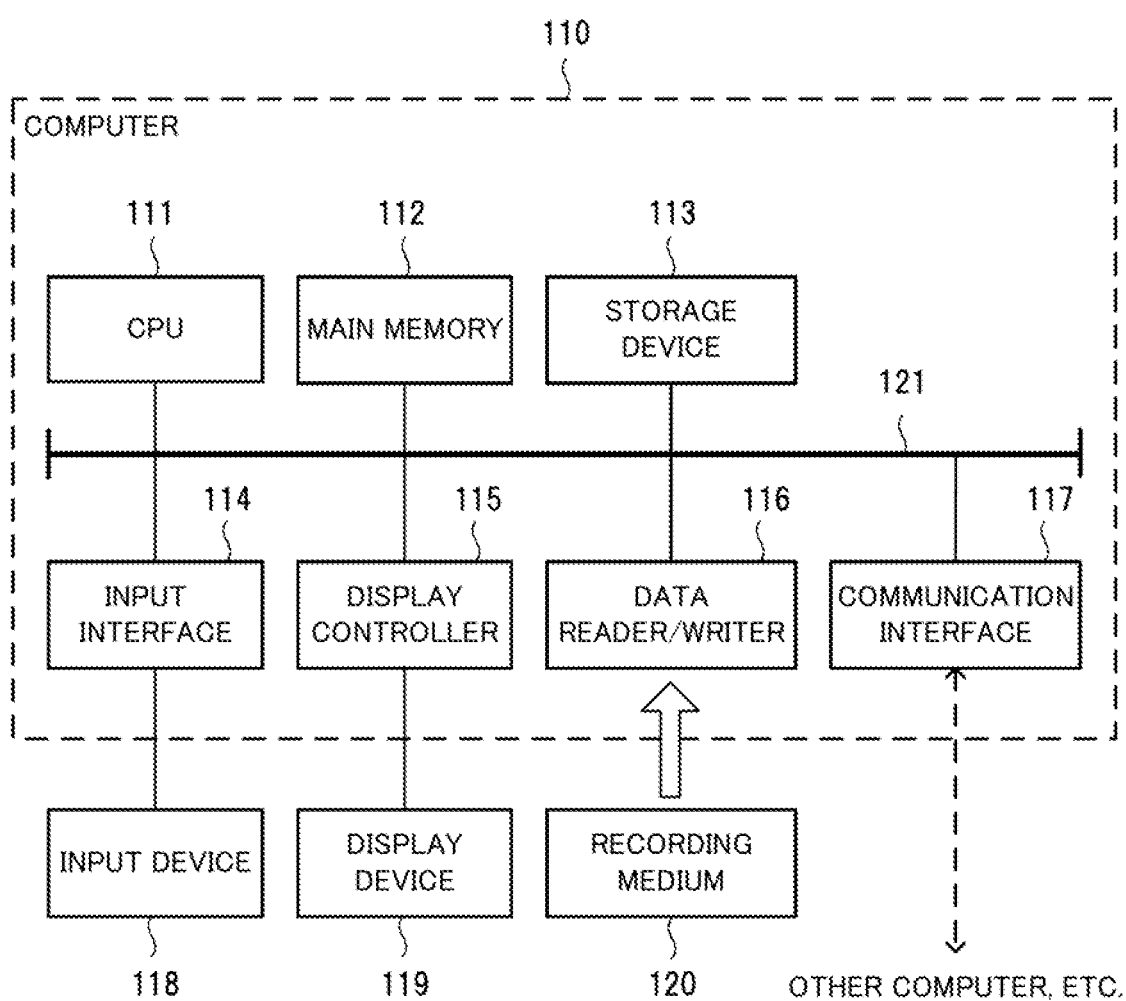
FIG. 6 is a diagram illustrating an example of a computer that realizes the information analyzing apparatus.

Here, a computer that realizes an information analyzing apparatus by executing the program according to an example embodiment will be described with reference to FIG. 6. FIG. 6 is a block diagram showing an example of a computer that realizes the search support apparatus according to an example embodiment of the invention.

As shown in FIG. 6, a computer 110 includes a CPU (Central Processing Unit) 111, a main memory 112, a storage device 113, an input interface 114, a display controller 115, a data reader/writer 116, and a communications interface 117. These units are each connected so as to be capable of performing data communications with each other through a bus 121. Note that the computer 110 may include a GPU (Graphics Processing Unit) or an FPGA (Field-Programmable Gate Array) in addition to the CPU 111 or in place of the CPU 111.

The CPU 111 opens the program (code) according to this example embodiment, which has been stored in the storage device 113, in the main memory 112 and performs various operations by executing the program in a predetermined order. The main memory 112 is typically a volatile storage device such as a DRAM (Dynamic Random Access Memory). Also, the program according to this example embodiment is provided in a state being stored in a computer-readable recording medium 120. Note that the program according to this example embodiment may be distributed on the Internet, which is connected through the communications interface 117.

Also, other than a hard disk drive, a semiconductor storage device such as a flash memory can be given as a specific example of the storage device 113. The input interface 114 mediates data transmission between the CPU 111 and an input device 118, which may be a keyboard or mouse. The display controller 115 is connected to a display device 119, and controls display on the display device 119.

The data reader/writer 116 mediates data transmission between the CPU 111 and the recording medium 120, and executes reading of a program from the recording medium 120 and writing of processing results in the computer 110 to the recording medium 120. The communications interface 117 mediates data transmission between the CPU 111 and other computers.

Also, general-purpose semiconductor storage devices such as CF (Compact Flash (registered trademark)) and SD (Secure Digital), a magnetic recording medium such as a Flexible Disk, or an optical recording medium such as a CD-ROM (Compact Disk Read-Only Memory) can be given as specific examples of the recording medium 120.

Also, instead of a computer in which a program is installed, the information analyzing apparatus 10 according to this example embodiment can also be realized by using hardware corresponding to each unit. Furthermore, a portion of the information analyzing apparatus 10 may be realized by a program, and the remaining portion realized by hardware.

[Supplementary Notes]

Furthermore, the following supplementary notes are disclosed regarding the example embodiments described above. Some portion or all of the example embodiments described above can be realized according to (supplementary note 1) to (supplementary note 18) described below, but the below description does not limit the invention.

(Supplementary Note 1)

An information analyzing apparatus including:

a detection unit configured to detect unknown word information expressing an unknown word contained in document information collected from web content; and a conversion unit configured to, using forum expression information contained in the unknown word information detected, converting the forum expression information into formal expression information by referring to expression conversion information for converting a forum expression into a formal expression set in advance.

(Supplementary Note 2)

The information analyzing apparatus according to supplementary note 1, wherein the detection unit detects the unknown word information from the document information collected from a hacker forum, the unknown word information being absent from a vocabulary of an analysis model that analyzes threat information.

(Supplementary Note 3)

The information analyzing apparatus according to supplementary note 2, further including:

a generation unit configured to generate threat information structured information expressing structuring of threat information by inputting the document information converted into the analysis model.

(Supplementary Note 4)

The information analyzing apparatus according to any one of supplementary notes 1 to 3, wherein the conversion unit generates document information in which the forum expression is converted into the formal expression using expression conversion information in which feature information expressing the forum expression and the formal expression information are associated with each other.

(Supplementary Note 5)

The information analyzing apparatus according to any one of supplementary notes 1 to 3, wherein the conversion unit generates document information in which the forum expression is converted into the formal expression using expression conversion information in which feature information expressing a character string of part of the forum expression and a character string of part of the formal expression information are associated with each other.

(Supplementary Note 6)

The information analyzing apparatus according to any one of supplementary notes 1 to 3, wherein the conversion unit extracts feature information from the unknown word information, inputs the feature information extracted into a conversion model, and outputs the formal expression information.

(Supplementary Note 7)

An information analyzing method including:

detecting unknown word information expressing an unknown word contained in document information collected from web content; and converting, using forum expression information contained in the unknown word information detected, the forum expression information into formal expression information by referring to expression conversion information for converting a forum expression into a formal expression set in advance.

(Supplementary Note 8)

The information analyzing method according to supplementary note 7, wherein the unknown word information is detected from the document information collected from a hacker forum, the unknown word information being absent from a vocabulary of an analysis model that analyzes threat information.

(Supplementary Note 9)

The information analyzing method according to supplementary note 8, further including:

generating threat information structured information expressing structuring of threat information by inputting the document information converted into the analysis model.

(Supplementary Note 10)

The information analyzing method according to any one of supplementary notes 7 to 9, wherein document information in which the forum expression is converted into the formal expression is generated using expression conversion information in which feature information expressing the forum expression and the formal expression information are associated with each other.

(Supplementary Note 11)

The information analyzing method according to any one of supplementary notes 7 to 9, wherein document information in which the forum expression is converted into the formal expression is generated using expression conversion information in which feature information expressing a character string of part of the forum expression and a character string of part of the formal expression information are associated with each other.

(Supplementary Note 12)

The information analyzing method according to any one of supplementary notes 7 to 9, wherein feature information is extracted from the unknown word information, the feature information extracted is input into a conversion model, and the formal expression information is output.

(Supplementary Note 13)

A computer-readable recording medium that includes a program recorded thereon, the program including instructions that cause a computer to carry out:

detecting unknown word information expressing an unknown word contained in document information collected from web content; and converting, using forum expression information contained in the unknown word information detected, the forum expression information into formal expression information by referring to expression conversion information for converting a forum expression into an formal expression set in advance.

(Supplementary Note 14)

The computer-readable recording medium according to supplementary note 13, wherein the unknown word information is detected from the document information collected from a hacker forum, the unknown word information being absent from a vocabulary of an analysis model that analyzes threat information.

(Supplementary Note 15)

The computer-readable recording medium according to supplementary note 14, wherein the computer is further caused to generate threat information structured information expressing structuring of threat information by inputting the document information converted into the analysis model.

(Supplementary Note 16)

The computer-readable recording medium according to any one of supplementary notes 13 to 15, wherein document information, in which the forum expression is converted into the formal expression, is generated using expression conversion information in which feature information expressing the forum expression and the formal expression information are associated with each other.

(Supplementary Note 17)

The computer-readable recording medium according to any one of supplementary notes 13 to 15, wherein document information, in which the forum expression is converted into the formal expression, is generated using expression conversion information in which feature information expressing a character string of part of the forum expression and a character string of part of the formal expression information are associated with each other.

(Supplementary Note 18)

The computer-readable recording medium according to any one of supplementary notes 13 to 15, wherein feature information is extracted from the unknown word information, the feature information extracted is input into a conversion model, and the formal expression information is output.

Although the invention of the application has been described above with reference to an example embodiment, the invention is not limited to the example embodiment described above. Various modifications apparent to those skilled in the art can be made to the configurations and details of the invention within the scope of the invention.

INDUSTRIAL APPLICABILITY

As described above, according to the invention, it is possible to analyze threat information even in documents containing forum expressions. The invention is useful in fields where it is necessary to structure threat information such as vulnerability information, malware information, and criminal threats used in cyber-attacks.

LIST OF REFERENCE SIGNS

10 Information analyzing apparatus
11 Detection unit
12 Conversion unit
13 Generation unit
14 Collection unit
15 Output information generation unit
20 System
21 Input device
22 Storage device
23 Output device
24 Collection target address storage unit
25 Analysis model storage unit
26 Expression conversion information storage unit
110 Computer
111 CPU
112 Main memory
113 Storage device
114 Input interface
115 Display controller
116 Data reader/writer
117 Communication interface 118 Input device
119 Display device
120 Recording medium
121 Bus

What is claimed is:

1. An information analyzing apparatus comprising:
at least one memory storing instructions; and
at least one processor configured to execute the instructions to:
read address information expressing a collection target, the address information recorded in a storage device;
access the Internet using the address information and obtain document information from web content at the address information;
detect, using the document information, unknown word information expressing unknown words that are not included in a vocabulary of an analysis model and that cannot be recognized as named entities after applying named entity recognitions to the document information, the analysis model for analyzing threat information;
extract forum expression information from the detected unknown word information;
convert the forum expression information into formal expression information based on a conversion rule for converting a forum expression included in expression conversion information into a formal expression;
generate threat information structured information expressing structuring of threat information by inputting the formal expression information into the analysis model;
convert the threat information structured information into a format that can be output to an output device; and
output the converted output information to the output device.

2. The information analyzing apparatus according to claim 1,
wherein the converts the forum expression information into the formal expression information using expression conversion information in which feature information expressing the forum expression and the formal expression information are associated with each other.

3. The information analyzing apparatus according to claim 1,
wherein the at least one processor converts the forum expression into the formal expression using expression conversion information in which feature information expressing a character string of part of the forum expression and a character string of part of the formal expression information are associated with each other.

4. The information analyzing apparatus according to claim 1,
wherein the at least one processor extracts feature information from the unknown word information, and inputs the feature information into a conversion model that outputs the formal expression information.

5. The information analyzing apparatus according to claim 1,
wherein the at least one processor further:
when identifying a term indicating a same attack group name or malware name alias, generates a distributed representation for the term in the formal expression information;
determines that the term is a known attack group or malware name alias when a distance between the generated distributed representation and a distributed representation of the known attack group name or malware name is less than a predetermined threshold value; and
outputs an alias of the determined attack group name or malware name alias in STIX (Structured Threat Information expression) format as the threat information structured information.

6. The information analyzing apparatus according to claim 1,
wherein the at least one processor further:
when extracting security reports or public documents in hacker forums that are related to each other, respectively generates distributed representations for the formal expression information;
applies clustering to the generated distributed representation;
generates clusters of similar distributed representations;
extracts a document corresponding to each distributed representation included in a same cluster as the security reports or public documents in hacker forums that are related to each other; and
outputs an alias of a same attack group name or malware name alias in STIX (Structured Threat Information expression) format as the threat information structured information.

7. The information analyzing apparatus according to claim 1,
wherein the at least one processor further:
when extracting new named entity recognitions in a security field, extracts information including attack group names or malware names contained in the formal expression information using a trained model of the named entity recognitions contained in the analysis model; and
outputs an alias of a same attack group name or malware name alias in STIX (Structured Threat Information expression) format as the threat information structured information.

8. An information analyzing method performed by a processor and comprising:
reading address information expressing a collection target, the address information recorded in a storage device;
accessing the Internet using the address information and obtain document information from web content at the address information;
detecting, using the document information, unknown word information expressing unknown words that are not included in a vocabulary of an analysis model and that cannot be recognized as named entities after applying named entity recognition to the document information, the analysis model for analyzing threat information;
extracting forum expression information from the detected unknown word information;
converting the forum expression information into formal expression information based on a conversion rule for converting a forum expression included in expression conversion information into a formal expression;
generating threat information structured information expressing structuring of threat information by inputting the formal expression information into the analysis model;
converting the threat information structured information into a format that can be output to an output device; and
outputting the converted output information to the output device.

9. The information analyzing method according to claim 8, comprising:
   converting the forum expression information into the formal expression information using expression conversion information in which feature information expressing the forum expression and the formal expression information are associated with each other.

10. The information analyzing method according to claim 8, comprising:
    converting the forum expression into the formal expression using expression conversion information in which feature information expressing a character string of part of the forum expression and a character string of part of the formal expression information are associated with each other.

11. The information analyzing method according to claim 8, comprising:
    extracting feature information from the unknown word information, and inputs the feature information into a conversion model that outputs the formal expression information.

12. A non-transitory computer-readable recording medium that includes storing a program executable by a computer to perform processing comprising:
    reading address information expressing a collection target, the address information recorded in a storage device;
    accessing the Internet using the address information and obtain document information from web content at the address information;
    detecting, using the document information, unknown word information expressing unknown words that are not included in a vocabulary of an analysis model and that cannot be recognized as named entities after applying named entity recognition to the document information, the analysis model for analyzing threat information;
    extracting forum expression information from the detected unknown word information;
    converting the forum expression information into formal expression information based on a conversion rule for converting a forum expression included in expression conversion information into a formal expression;
    generating threat information structured information expressing structuring of threat information by inputting the formal expression information into the analysis model;
    converting the threat information structured information into a format that can be output to an output device; and
    outputting the converted output information to the output device.

13. The non-transitory computer-readable recording medium according to claim 12, the processing comprising:
    converting the forum expression information into the formal expression information using expression conversion information in which feature information expressing the forum expression and the formal expression information are associated with each other.

14. The non-transitory computer-readable recording medium according to claim 12, the processing comprising:
    converting the forum expression into the formal expression using expression conversion information in which feature information expressing a character string of part of the forum expression and a character string of part of the formal expression information are associated with each other.

15. The non-transitory computer-readable recording medium according to claim 12, the processing comprising:
    extracting feature information from the unknown word information, and inputs the feature information into a conversion model that outputs the formal expression information.

* * * * *